(12) United States Patent
Edwards

(10) Patent No.: US 7,984,503 B2
(45) Date of Patent: Jul. 19, 2011

(54) SYSTEM, METHOD AND COMPUTER PROGRAM PRODUCT FOR ACCELERATING MALWARE/SPYWARE SCANNING

(75) Inventor: Jonathan L. Edwards, Portland, OR (US)

(73) Assignee: McAfee, Inc., Santa Clara, CA (US)

(*) Notice: Subject to any disclaimer, the term of this patent is extended or adjusted under 35 U.S.C. 154(b) by 1008 days.

(21) Appl. No.: 11/010,786

(22) Filed: Dec. 13, 2004

(65) Prior Publication Data
US 2006/0075502 A1 Apr. 6, 2006

Related U.S. Application Data

(63) Continuation-in-part of application No. 10/952,039, filed on Sep. 27, 2004, now Pat. No. 7,441,273.

(51) Int. Cl.
*G06F 11/30* (2006.01)
*G06F 12/14* (2006.01)
*G06F 9/46* (2006.01)

(52) U.S. Cl. .................... 726/24; 713/188; 718/107

(58) Field of Classification Search .............. 726/22–24; 713/188; 718/107
See application file for complete search history.

(56) References Cited

U.S. PATENT DOCUMENTS

| | | | | |
|---|---|---|---|---|
| 5,960,170 A * | 9/1999 | Chen et al. | ........................ | 714/38 |
| 6,785,818 B1 | 8/2004 | Sobel et al. | ........................ | 713/200 |
| 6,836,860 B2 * | 12/2004 | Muttik et al. | ........................ | 714/38 |
| 7,203,681 B1 * | 4/2007 | Arnold et al. | ........................ | 707/7 |
| 7,203,868 B1 * | 4/2007 | Evoy | ........................ | 714/39 |
| 7,216,366 B1 * | 5/2007 | Raz et al. | ........................ | 726/24 |
| 7,225,343 B1 * | 5/2007 | Honig et al. | ........................ | 713/194 |
| 7,257,842 B2 * | 8/2007 | Barton et al. | ........................ | 726/24 |
| 7,263,616 B1 * | 8/2007 | Brackett | ........................ | 713/188 |
| 7,437,764 B1 * | 10/2008 | Sobel et al. | ........................ | 726/25 |
| 7,448,084 B1 * | 11/2008 | Apap et al. | ........................ | 726/24 |
| 7,490,354 B2 * | 2/2009 | Garbow et al. | ........................ | 726/24 |
| 7,669,059 B2 * | 2/2010 | Brent | ........................ | 713/188 |
| 2002/0083183 A1 * | 6/2002 | Pujare et al. | ........................ | 709/231 |
| 2003/0110253 A1 * | 6/2003 | Anuszczyk et al. | ........................ | 709/224 |
| 2004/0193896 A1 * | 9/2004 | Kaneko | ........................ | 713/188 |
| 2005/0021994 A1 * | 1/2005 | Barton et al. | ........................ | 713/200 |
| 2005/0081053 A1 | 4/2005 | Aston et al. | ........................ | 713/200 |
| 2005/0216749 A1 | 9/2005 | Brent | ........................ | 713/188 |

(Continued)

FOREIGN PATENT DOCUMENTS

WO 00/36503 6/2000

OTHER PUBLICATIONS

Frank Apap et al. Detecting Malicious Software by Monitoring Anomalous Windows Registry Accesses. 2001. p. 1-18.*

(Continued)

*Primary Examiner* — Christian LaForgia
(74) *Attorney, Agent, or Firm* — Wong, Cabello, Lutsch, Rutherford & Brucculeri LLP

(57) ABSTRACT

A system, method and computer program product are provided for scanning files. A plurality of file names in a registry of a computer is identified. By this identification, files associated with the file names are scanned. Another system, method and computer program product are further provided. In particular, a change in a registry of a computer is first identified. Then, a scan is conditionally performed based on whether the change in the registry is identified.

31 Claims, 8 Drawing Sheets

U.S. PATENT DOCUMENTS

| | | | |
|---|---|---|---|
| 2006/0005244 A1* | 1/2006 | Garbow et al. | 726/24 |
| 2006/0015940 A1* | 1/2006 | Zamir et al. | 726/22 |
| 2006/0031673 A1* | 2/2006 | Beck et al. | 713/164 |
| 2007/0150956 A1* | 6/2007 | Sharma et al. | 726/24 |
| 2009/0083855 A1* | 3/2009 | Apap et al. | 726/24 |

OTHER PUBLICATIONS

Frisch, Aeleen. Essential Windows NT System Administration. 1998. O'Reilly. p. 18-22.*

Search Report from application GB0523996 mailed Mar. 30, 2006.

www.Runtimeware.com.

Office Action Summary from European Application No. GB0523996.7 dated May 24, 2010.

Search and Examination Report from United Kingdom Application No. GB0523996.7, dated Jan. 10, 2011.

* cited by examiner

SYSTEM, METHOD AND COMPUTER PROGRAM PRODUCT FOR ACCELERATING MALWARE/SPYWARE SCANNING

RELATED APPLICATION(S)

The present application is a continuation-in-part of an application filed Sep. 27, 2004 under application Ser. No. 10/952,039, now U.S. Pat. No. 7,441,273 and which is incorporated herein by reference.

FIELD OF THE INVENTION

The present invention relates to computer/network scanning, and more particularly to scanning for spyware and/or malware.

BACKGROUND

In the space of just a decade, the Internet, because it provides access to information, and the ability to publish information, in revolutionary ways, has emerged from relative obscurity to international prominence. Whereas, in general, an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. These opportunities have been exploited time and time again by many types of malware including, but is not limited to computer viruses, worms, Trojan horses, etc. As experience has shown, the frontier of cyberspace has its share of scofflaws, resulting in increased efforts to protect the data, resources, and reputations of those embracing intranets and the Internet.

Recently, some new types of software have emerged, collectively called "spyware." Spyware, while not as malicious as the aforementioned conventional viruses, Trojan horses, etc., may still cause problems for computer users. For example, spyware may be designed to log keystrokes, track which websites a computer user visits, and/or transmit personal information to a third party.

In the context of the present description, the term spyware is further deemed to include other related types of similar software such as adware, dialer software, other equivalents, and/or any other software that is less malicious than conventional malware. For example, adware is typically designed to download and display advertisements on a screen of a computer, and can be very intrusive. Dialer software, on the other hand, is designed to redirect a dial-up Internet Service Provider (ISP) connection of a computer to a different, more expensive phone number, in exchange for access to something, typically pornography.

Often, this software is marketed as legitimate applications which the computer user ostensibly installs willingly. For example, a free music player application may be come bundled with adware and require that the adware be installed before the music player application will work. The owner of the adware conventionally pays the owner of the music player to include the adware.

Although some of these examples of spyware border on legitimacy, many of these applications are poorly written, and cause compatibility problems with other software. Moreover, spyware can be very intrusive, waste network bandwidth, and cause a slew of other problems.

While the distinguishing feature of malware such as a computer virus is still that it replicates from file to file, such malware has evolved from simply being pieces of code that replicate into tools to enable more targeted violations of computer security. This trend is seen most clearly in the existence of "zombie" networks. These networks come into being when a virus infects many computers which all then communicate to the malware author awaiting commands. Once the network is in place, it can be used for many nefarious deeds including launching denial of service attacks, sending SPAM, etc.

As computer systems are become more and more complicated and associated disks contain more and more files, an increasing amount of time is needed to scan all these files in order to detect spyware and/or malware. On some large file servers containing many terabytes of data, such time to perform a complete scan can exceed one week. Unfortunately, it is often necessary to be able to detect spyware and/or malware in a much more expeditious manner.

Further, it is sometimes beneficial for a malware and/or spyware scanner product to contain a true "on-access scanner," which scans files the instant they are created. Unfortunately, it is sometimes not possible for some products to incorporate such an on-access scanner. In these cases, the system is only protected by "on-demand scanning," which is a scan that is run per a certain schedule, for example, once per day. Because such scanning happens infrequently, there is a sizeable window of opportunity for spyware and/or malware to cause harm.

There is thus a need for overcoming these and/or other problems associated with the prior art.

SUMMARY

A system, method and computer program product are provided for scanning files. A plurality of file names in a registry of a computer is initially identified. By this identification, files associated with the file names are scanned.

In one embodiment, the file names may be identified utilizing a predetermined format associated therewith. Such format may include a path. Further, in use, duplicate file names may be removed. To this end, spyware (adware, spyware, etc.) and/or malware may be more effectively detected.

Another system, method and computer program product are provided. In particular, a change in a registry of a computer is first identified. Then, a scan is conditionally performed based on whether the change in the registry is identified.

In one embodiment, the registry may be continuously monitored for identifying the change. As a further option, a separate scheduled scan may be performed on a periodic basis. Thus, the conditional scan may be performed prior to the scheduled scan. Further, the conditional scan may be performed in parallel with the scheduled scan.

In yet another embodiment, the conditional scan may include scanning the registry. Such scanning of the registry may include scanning the registry for at least one predetermined key. Such predetermined key may thus be deleted upon the detection thereof.

In still yet another embodiment, the conditional scan may include scanning at least one file. In one aspect of the present embodiment, the change that is identified may include a change to any file name in the registry. Thus, the file to be scanned may include only files associated with the changed file name in the registry. In another embodiment, the conditional scan may include scanning all of the files identified in the registry.

To this end, the time required for the scanning may be less than the time required for scanning files stored on harddisks of the computer.

In one embodiment, the registry may include a location on the computer for storing information including hardware that is attached to the computer, system options that have been selected, a configuration of memory of the computer, and/or application programs to be present when an operating system of the computer is started.

Strictly as an option, the present technology may further be utilized to counter terrorism.

DETAILED DESCRIPTION

Figure 1:
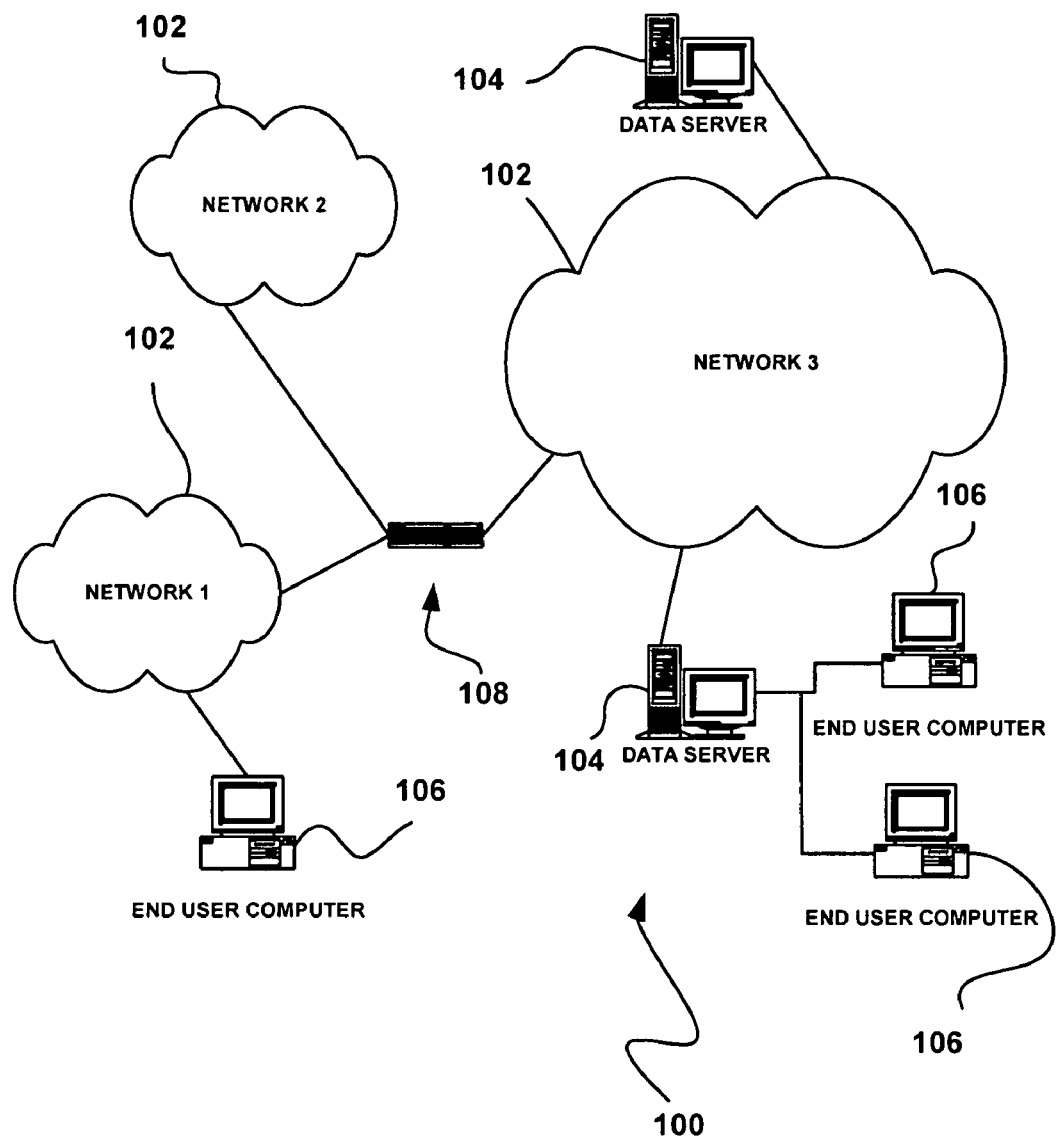
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

It should be noted that each of the foregoing network devices in the present network architecture 100, as well as any other unillustrated hardware and/or software, may be equipped with various security features. For example, the various data server computers 104 and/or end user computers 106 may be equipped with security functionality in the form of a virus scanner, etc. for purposes that will be set forth hereinafter in greater detail. More information regarding optional functionality and architectural features will now be set forth for illustrative purposes.

Figure 2:
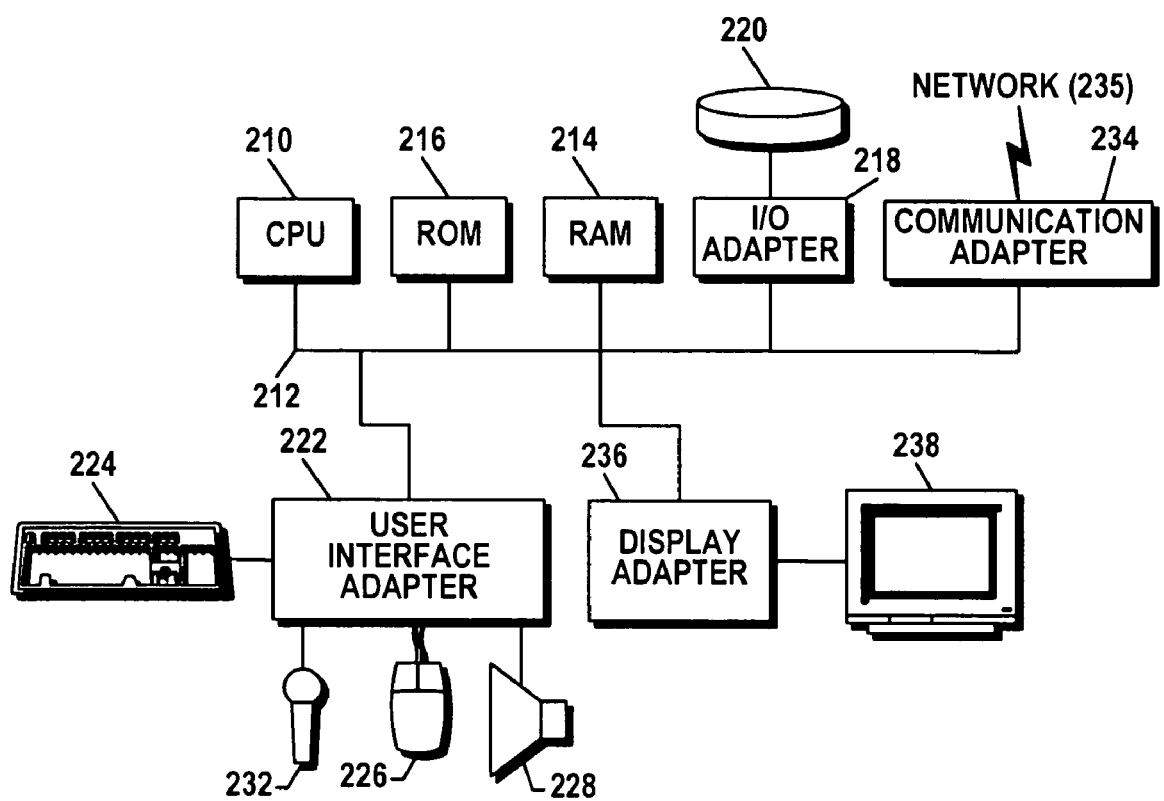
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
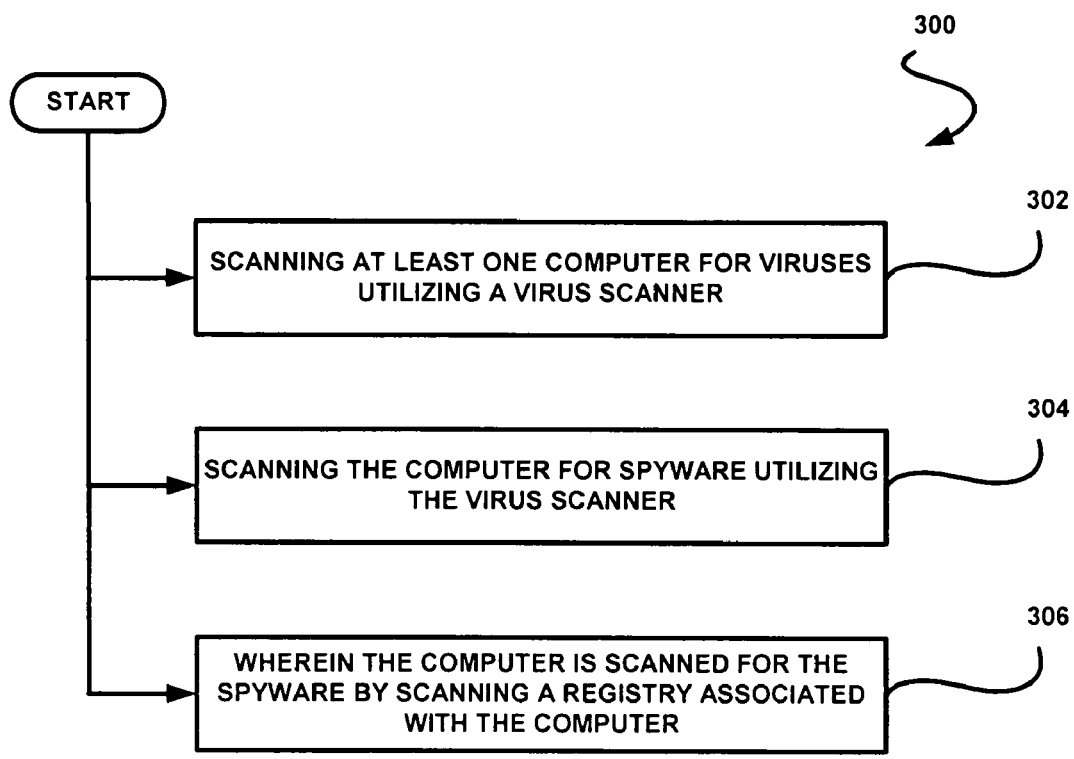
FIG. 3 illustrates a method for scanning for spyware utilizing a virus scanner, in accordance with one embodiment.

FIG. 3 illustrates a method 300 for scanning for spyware utilizing a virus scanner, in accordance with one embodiment. As an option, the present method 300 may be implemented in the context of the architecture and environment of FIGS. 1 and/or 2. Of course, however, the method 300 may be carried out in any desired environment.

In operation 302, at least one computer (e.g. see computers 104, 106 of FIG. 1, for example, etc.) is scanned for viruses utilizing a virus scanner. In the context of the present description, the term virus scanner may include any hardware, software, and/or logic that is capable of at least detecting viruses and, optionally, any other type of malware. Further in the context of the present description, malware (i.e. "malicious software") may refer to any programming or files that are developed for the purpose of doing harm to a computer and/or network components. Thus, malware may include, but is not limited to various forms of computer viruses, worms, Trojan horses, etc.

Further, in operation 304, the computer is further scanned for spyware utilizing the virus scanner. Again, in the context of the present description, the term spyware is deemed to include spyware, adware, dialer software, other equivalents, and/or any other software that is less malicious than conventional malware, etc. As shown in FIG. 3, the spyware and virus scanning may take place in parallel.

Of course, it should be noted that such spyware and virus scanning may be performed in parallel, in series, simultaneously, separately, etc., as long as the virus scanner is carrying out such scanning. While any of the foregoing options are possible, there may be a performance impact when spyware scanning is run simultaneously with virus scanning. Thus, separate scanning for spyware and viruses may be employed to prevent such performance impact.

Further, it should be noted that the spyware scanning should be deemed to be carried out by the virus scanner, even if only a sub-component, related component, etc. of the virus scanner is carrying out such spyware scanning. For example, it is conceivable that a comprehensive virus scanner may be equipped with a spyware component via an "upgrade," "update," etc. Still yet, the virus scanner may be part of a large single system (e.g. an enterprise system with a firewall, intrusion detection capabilities, etc.), which further includes a spyware scanning capability. Even still, the virus scanner may simply be sold with the spyware scanning capability, as a single system. In each of these instances (as well as others not explicitly set forth), the spyware scanning capability is deemed to be provided, at least in part, "utilizing the virus scanner."

In use, the computer is scanned for the spyware by scanning a registry associated therewith. Note operation 306. Spyware, in many (but not all) instances, may alter the registry in some way, thus making registry scanning an effective technique for detecting spyware.

In one embodiment, the registry may include a location on the computer for storing information such as hardware that is attached to the computer, system options that have been selected, a configuration of memory of the computer, and/or application programs to be present when an operating system of the computer is started. In the specific context of the Microsoft® Windows® operation system, the registry may include the sections noted in Table 1.

TABLE 1

HKEY_Classes_Root - file associations and OLE information
HKEY_Current_User - all preferences set for current user
HKEY_User - all the current user information for each user of the system
HKEY_Local_Machine - settings for hardware, operating system, and installed applications
HKEY_Current_Configuration - settings for the display and printers
HKEY_Dyn_Data - performance data Of course, in the context of the present description, the registry may include any data used by an operating system to store configuration information.

More information will now be set forth regarding one exemplary embodiment utilizing various optional features each of which may (or may not) be incorporated with the foregoing method 300 of FIG. 3, per the desires of the user.

Figure 4A:
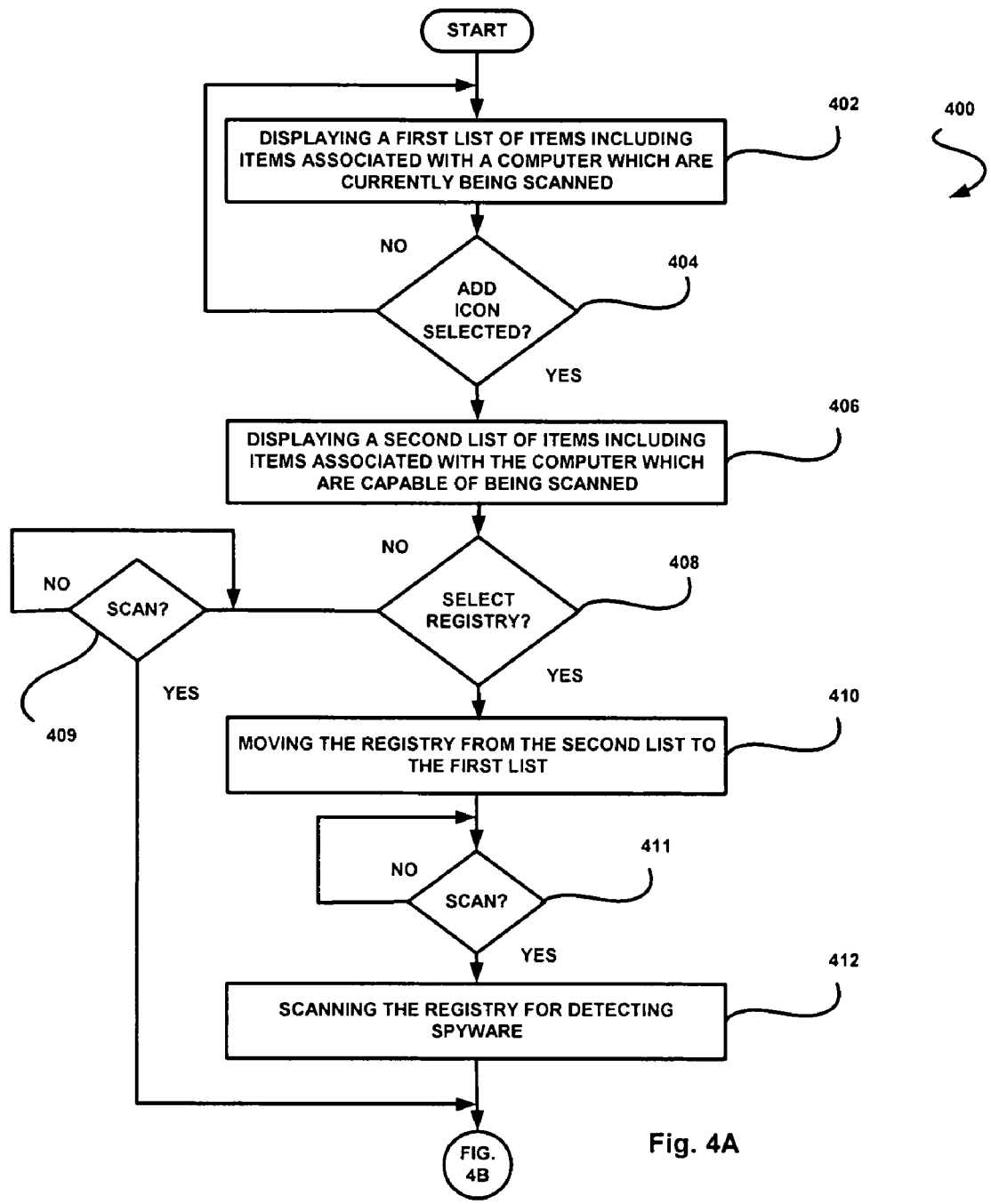
FIGS. 4A-4B illustrate a method for scanning for spyware utilizing a virus scanner, in accordance with another embodiment.
Figure 4B:
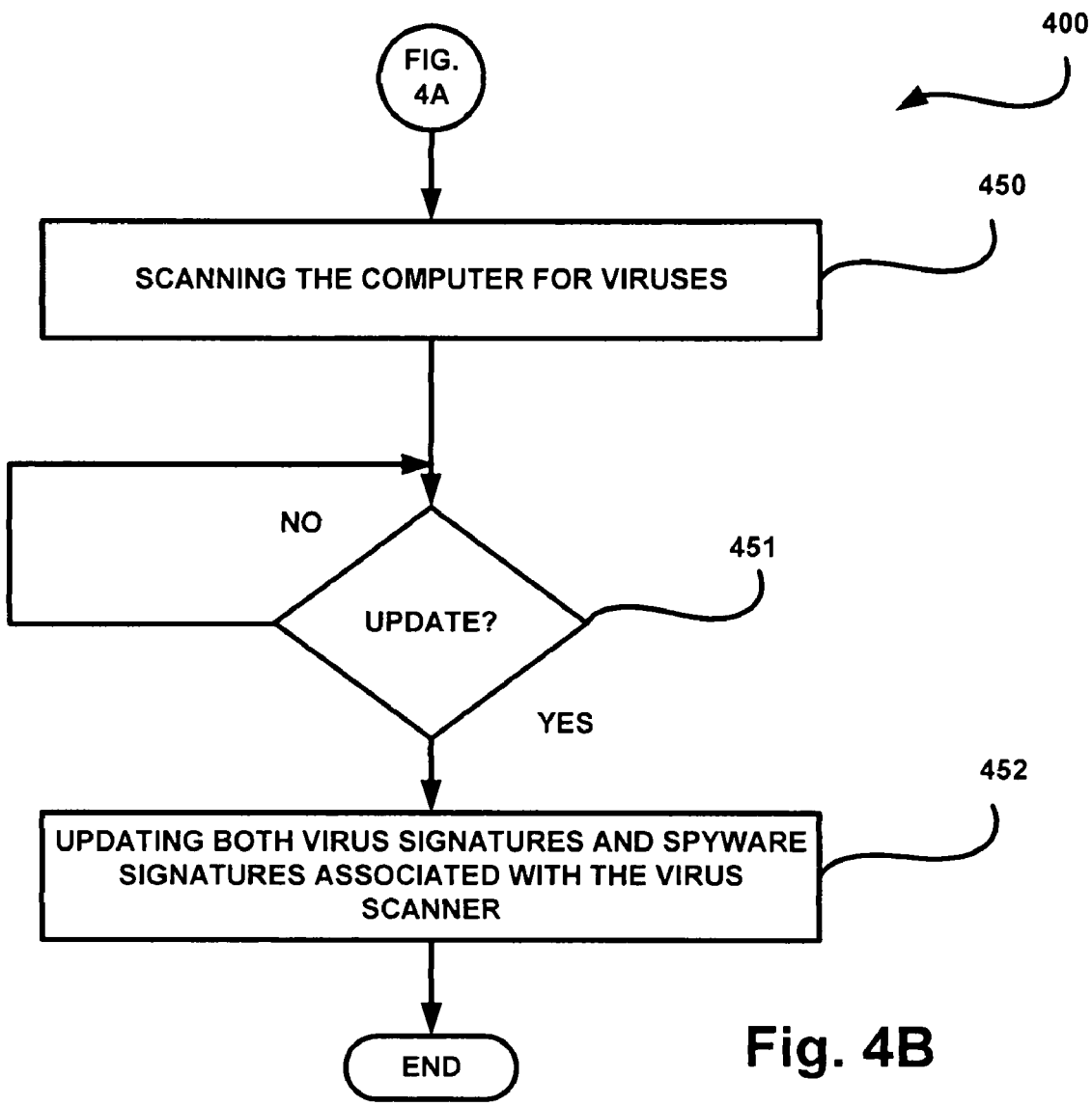

FIGS. 4A-4B illustrate a method 400 for scanning for spyware utilizing a virus scanner, in accordance with another embodiment. As an option, the present method 400 may be implemented in the context of the architecture and environment of FIGS. 1 and/or 2, and even the method 300 of FIG. 3. Of course, however, the method 400 may be carried out in any desired environment.

With reference first to FIG. 4A, a first list of items is displayed in operation 402. Such first list may include items associated with a computer (e.g. see computers 104, 106 of FIG. 1, for example, etc.) which are currently being scanned. Thus, the first list may operate to identify and track which items of the computer are being scanned during use of the virus scanner.

In use, it is determined whether an add icon has been selected by a user. Note decision 404. As will soon become apparent, the add icon allows the user to add additional items to the first list, thus ensuring that such additional items are included in a scan. To this end, upon detection of the selection of the icon by the user, a second list of items is displayed. Note operation 406. Such second list includes items associated with the computer which are capable of being scanned (and not already being scanned per the first list). Moreover, such second list of items includes a registry of the computer, for scanning for spyware, as will soon become apparent.

It is then determined in decision 408 whether the user selects the registry in the second list. Upon the detection of the selection of the registry in the second list (as determined in decision 408), the registry is moved from the second list to the first list. Note operation 410. Movement of the registry in such manner thus provides a technique for optionally allowing the registry to be scanned for detecting spyware.

While the method 400 has set forth a technique for including spyware scanning (by movement of the registry item from the second list to the first list), it should be noted that a remove button may also be used to disable spyware scanning (by movement of the registry item from the first list to the second list). To this end, the registry associated with the computer may be conditionally scanned based on user input. More information regarding an exemplary graphical user interface for facilitating the forgoing functionality will be set forth hereinafter in greater detail.

In decisions 409 and 411, it is determined whether a scan should take place. Of course, such determination may take any form based on whether the scanner is an on-demand, on-access, etc. scanner. If it is determined in decision 411 that a scan should take place, the registry of the computer is scanned for detecting spyware, utilizing the virus scanner (since the registry was moved to the first list, etc.). Note operation 412. As an option, a user interface that indicates, in real-time, when and what is being scanned, may be updated to indicate the registry, during operation 412. If, however, it is determined in decision 409 that a scan should take place, the registry of the computer is not scanned for detecting spyware (since the registry was not moved to the first list, etc.).

In any case, if it is determined in either decision 409 or 411 that a scan should take place, the computer is scanned for viruses, utilizing the virus scanner. See operation 450 of FIG. 4B.

With continuing reference to FIG. 4B, it is determined in decision 451, whether an update event is detected. Of course, such update event may be manually initiated and/or automatically initiated by a client and/or server based on a periodic basis, predetermined scheduling, etc. Upon the detection of the update event, both virus signatures and spyware signatures associated with the virus scanner are updated. Note operation 452.

As an option, the spyware signatures and virus signatures of the virus scanner may be updated via a network (e.g. see, for example, networks 102 of FIG. 1, etc.). More particularly, the spyware signatures and virus signatures of the virus scanner may be updated together and/or simultaneously. By coordinating the updating of the virus and spyware signature updates, updating mechanisms need not be duplicated. Moreover, any overlap in the signatures themselves can be eliminated. Table 2 illustrates an exemplary log of an illustrative update process.

TABLE 2

Figure 5:
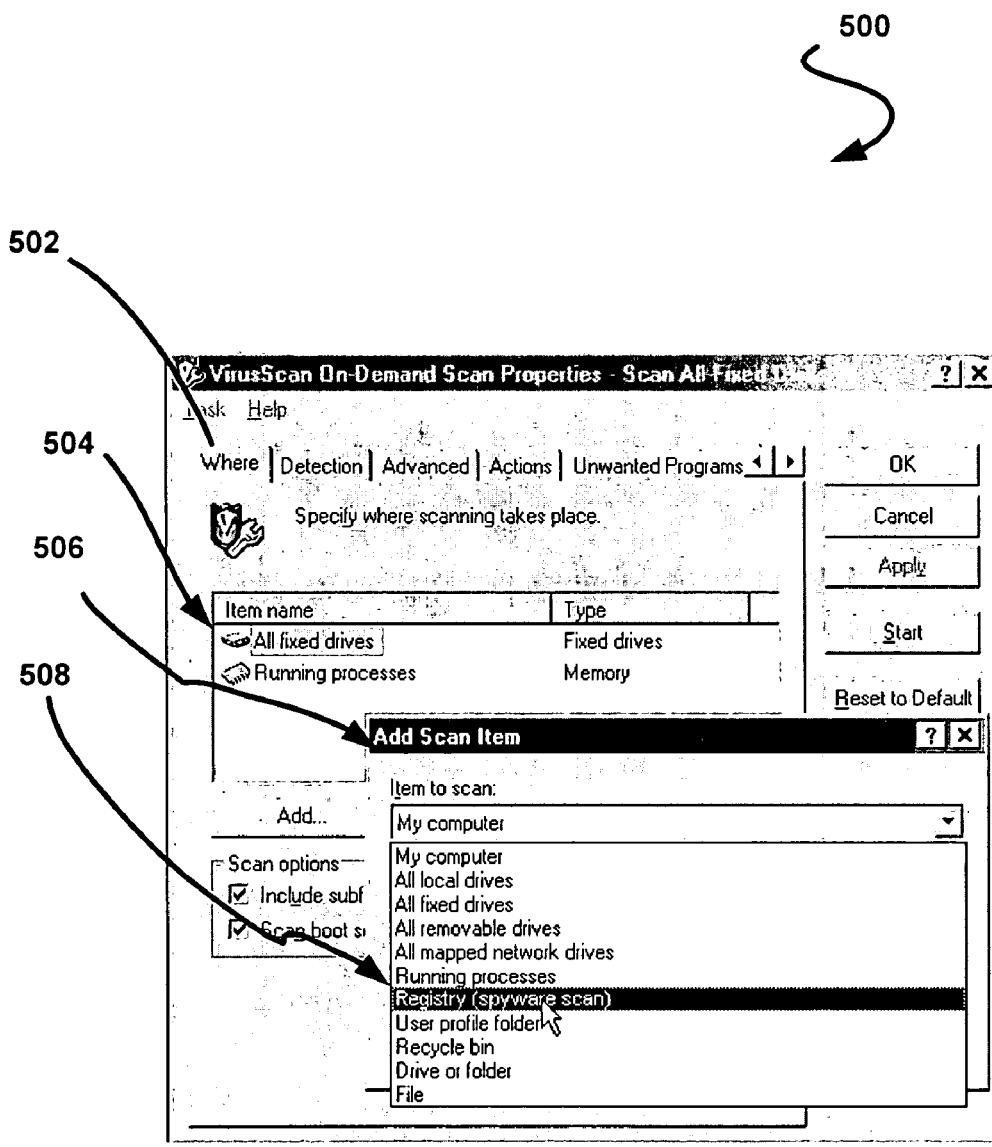
FIG. 5 illustrates an exemplary graphical user interface for scanning for spyware utilizing a virus scanner, in accordance with one embodiment.

Updating Virus Signatures
    Downloading DAT4390.ZIP
    Installing 4390 Signatures
Updating AntiSpyware Signatures
    Downloading SPY3820.ZIP
    Installing 3820 Signatures FIG. 5 illustrates an exemplary graphical user interface 500 for scanning for spyware utilizing a virus scanner, in accordance with one embodiment. As an option, the present interface 500 may be implemented in the context of the architecture and environment of FIGS. 1 and/or 2, and even the methods 300 and 400 of FIGS. 3-4B. Of course, however, the interface 500 may be carried out in any desired environment.

As shown, a graphical user interface 500 is provided which may be displayed in an options menu associated with a virus scanner. Specifically, such interface 500 may be displayed upon a user initiating the options menu while using the virus scanner. As mentioned earlier, the interface 500 may include a field for receiving the user input for controlling the virus scanner with respect to spyware scanning.

Specifically, such field of the graphical user interface 500 may include a first list 504 of items associated with the computer. Such first list 504 may include items associated with the computer which are being scanned.

Associated therewith is a second list 506 that may be displayed upon the selection of an icon (e.g. an "add" icon, etc.). Such items of the second list 506 may include the registry 508. Further, the items of the second list 506 may include additional items associated with the computer which are capable of being scanned upon the selection thereof. As shown, such items may further include local drives, fixed drives, removable drives, network drives, running processes, a user profile folder, and/or a recycle bin.

In use, the items of the second list 506 may be moved to the first list 508 upon the selection thereof, as set forth earlier. To this end, duplication of options, updating, etc. between the virus and spyware scanning is removed.

Thus, the present embodiment is capable of exploiting the similarities of virus and spyware scanning for removing duplication, etc. For example, at a high level, a virus scanner often needs to examine various parts of the computer to look for suspicious files or configuration data. Still yet, reports of what has been found and cleaned sometimes need to be generated and correlated so that an administrator can track anomalies in an organization. Spyware, like new viruses, is continuously being written, so analysis of new samples may be needed and the results of this analysis may need to get to the computers running the scanner in the form of periodic updates to signatures, etc.

Of course, the virus scanner may account for the differences between virus and spyware scanning, to accommodate the same. Reporting may require a different level of granularity and urgency. With a virus, many files may be infected with the virus. With spyware, on the other hand, there is often just once instance installed, but it may consist of different files and registry entries. A virus outbreak is also much more serious than spyware being found. Spyware is typically less malicious and does not actively try to spread from computer to computer (in most cases). Generating instant alerts and responses may thus be applied to virus scanning, but may be avoided during spyware scanning in some situations.

Still yet, a new virus may be released and spread around the world in minutes. A mechanism for extremely fast deployment of new signatures for detection may thus be important when virus scanning. Spyware, on the other hand, spreads slowly, is less malicious, and is easier to remove when detected. Therefore, the frequency/number of updating instances of the spyware signatures may be less than virus signature updates, in one embodiment.

More information will now be set forth regarding one exemplary embodiment utilizing various optional features each of which may (or may not) be incorporated with the foregoing technology of FIGS. 1-5, per the desires of the user.

Figure 6A:
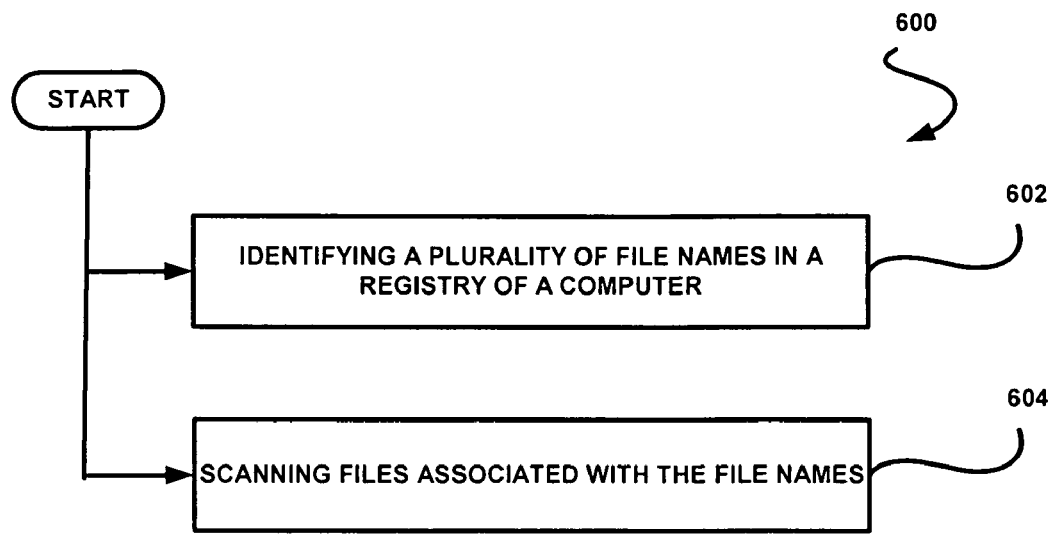
FIGS. 6A-6B illustrate methods for combating spyware, malware, etc., in accordance with one embodiment.
Figure 6B:
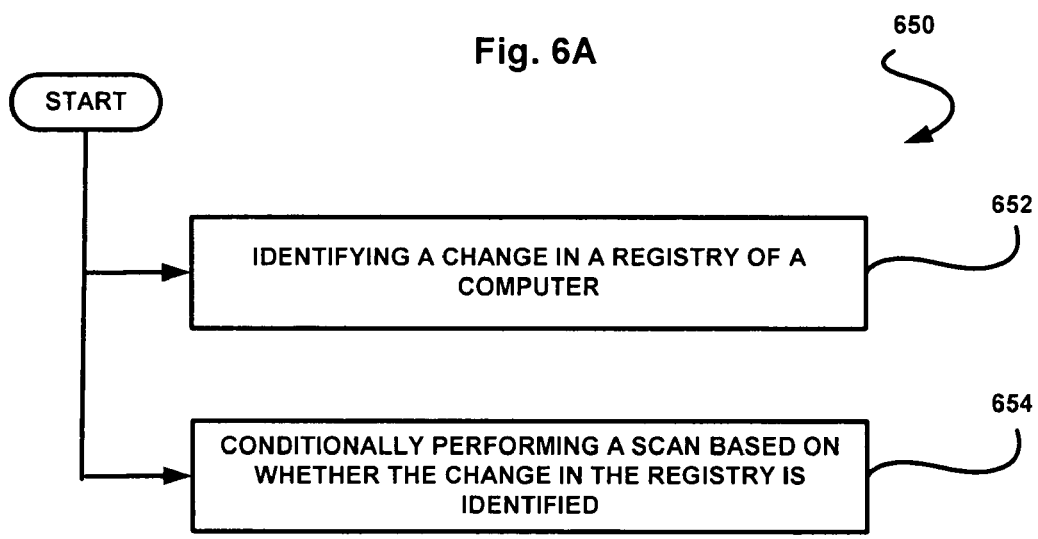

FIGS. 6A-6B illustrate methods 600, 650 for combating spyware, malware, etc., in accordance with one embodiment. As an option, the present methods 600, 650 may be implemented in the context of the architecture and environment of FIGS. 1 and/or 2, as well as the functionality of FIGS. 3-5, and the descriptions thereof. Of course, however, the methods 600, 650 may be carried out without any of the previously disclosed features, and/or in any other desired environment.

As shown in FIG. 6A, the method 600 is provided for scanning files. Specifically, in operation 602, a plurality of file names in a registry of a computer (e.g. see computers 104, 106 of FIG. 1, for example, etc.) is identified.

As mentioned earlier, in one embodiment, the registry may include a location on the computer for storing information such as hardware that is attached to the computer, system options that have been selected, a configuration of memory of the computer, and/or application programs to be present when an operating system of the computer is started. In the specific context of the Microsoft® Windows® operation system, the registry may include the sections noted in Table 1 above. Of course, in the context of the present description, the registry may include any data used by an operating system to store configuration information.

By this identification, files associated with the file names are scanned. Note operation 604. Thus, any files with associated file names in the registry are scanned. Since malware, spyware, etc. often manipulate the registry so as to ensure that such software is run by the operating system (as well as to support other functionality), the present method 600 ensures that any such software that utilizes the registry in any manner is scanned, and managed accordingly.

Moving to FIG. 6B, another method 650 is provided. As shown, a change in a registry of a computer (e.g. see computers 104, 106 of FIG. 1, for example, etc.) is first identified. See operation 652. This change can be identified in any desired way that identifies any difference in the registry at one particular time, with respect to another.

Then, in operation 654, a scan is conditionally performed based on whether the change in the registry is identified. Such scan may include any scan that is capable of identifying any malware, spyware, etc. that may have caused the change. Again, malware, spyware, etc. often manipulate the registry so as to ensure that such software is run by the operating system, as well as to support other functionality. The present method 650 ensures that any such change prompts a scan, so that remedial measures may be optionally taken.

More information will now be set forth regarding one exemplary embodiment utilizing various optional features each of which may (or may not) be incorporated with the foregoing methods 600, 650 of FIG. 6A-6B, per the desires of the user. As will soon be set forth, the following embodiment incorporates an optional combination of the foregoing methods 600, 650 of FIG. 6A-6B.

Figure 7:
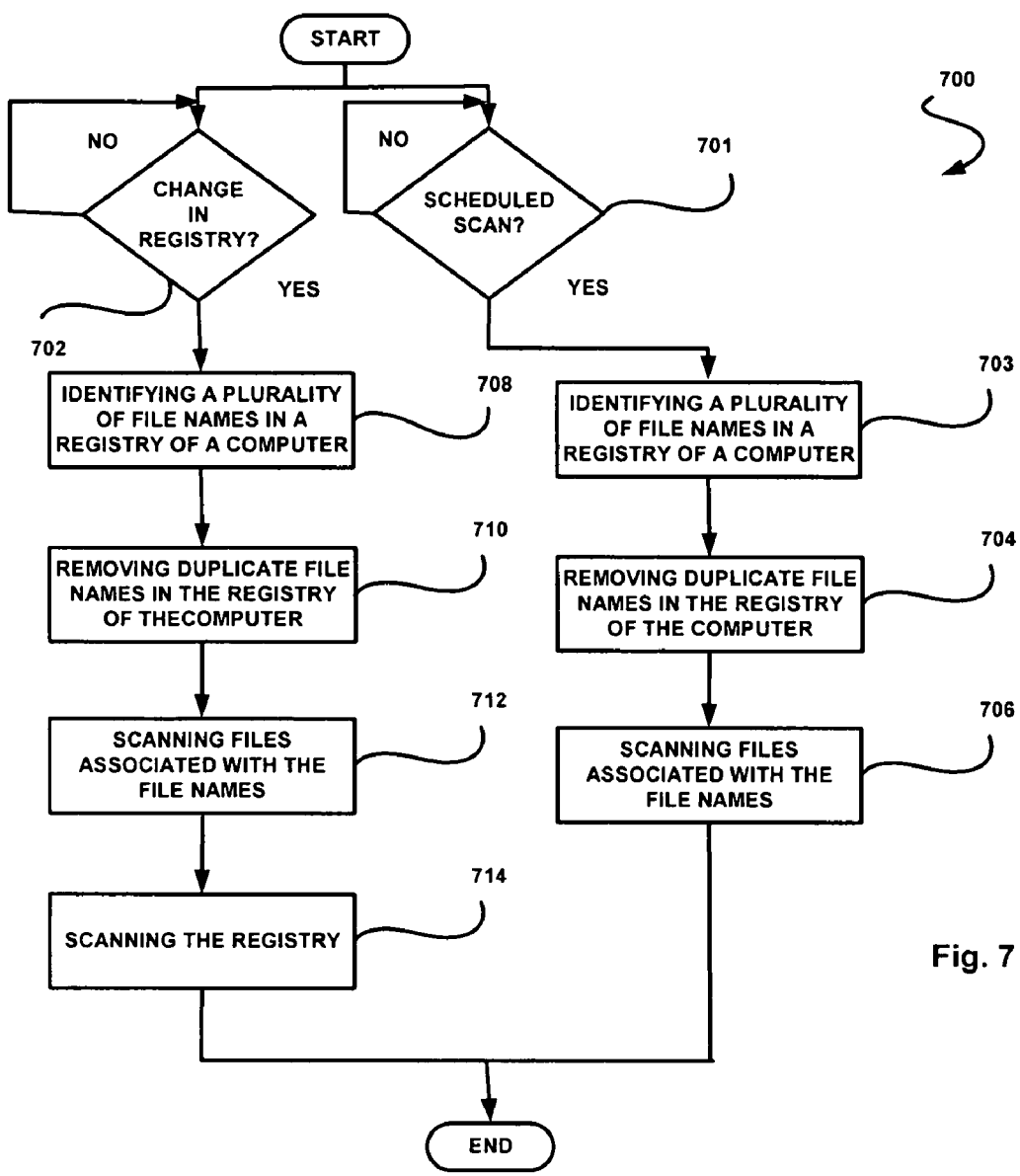
FIG. 7 illustrates a method for combating spyware, malware, etc., in accordance with another embodiment.

FIG. 7 illustrates a method 700 for combating spyware, malware, etc., in accordance with another embodiment. As an option, the present method 700 may be implemented in the context of the architecture and environment of FIGS. 1 and/or 2, as well as the functionality of FIGS. 3-6B, and the descriptions thereof. Of course, however, the method 700 may be carried out without any of the previously disclosed features, and/or in any other desired environment.

As shown, decisions 701 and 702 (and the following respective operations) may operate in parallel. Of course, in another embodiment, serial or at least partial serial operation may also be implemented. With respect to decision 701, it is first determined whether a scan is scheduled. Such scheduling may be automatic, on periodic basis, or performed by a local user and/or remote administrator. In any case, if it is determined that a scan is scheduled per decision 701, various operations are performed.

First, in operation 703, a plurality of file names is identified in a registry of a computer (e.g. see computers 104, 106 of FIG. 1, for example, etc.). File names may be identified based on a particular format associated therewith. In particular, file names often have a small number of allowable forms. For example, a computer running Microsoft® Windows® includes file names that take the following form: <drive letter><colon><backslash><path><name> (e.g. c:\program files\spyware.exe, etc.). Of course, there are other allowable forms, but only a few exist and they are all as well defined. Thus, it is possible to distinguish file names from other arbitrary alphanumeric data.

Next, in operation 704, duplicate file names in the registry are removed. Thus, only one instance of each file name remains. Thereafter, files associated with the file names are scanned for spyware and/or malware, etc. See operation 706. As an option, the location of the files may be determined using the file names and associated path information.

To this end, the time required for performing the aforementioned scan may be less than the time required for scanning files stored on harddisks of the computer, as other on-demand scanners typically require. In one example involving a typical system, it may take about 10 seconds to extract data from the registry providing a list on the order of 1000 files, which takes around 1 minute to scan.

With reference now to decision 702, a change in the registry is identified. Again, this change can be identified in any desired way that identifies a difference in the registry at one particular time, with respect to another. Of course, other specific changes may be monitored. For example, changes involving file names may be specifically monitored, if desired.

In one embodiment, the registry may be continuously monitored for identifying the occurrence of a change. Thus, the conditional scan may be performed prior to the scheduled scan. In other words, the conditional scan may be performed at any time, while the scheduled scan may occur at specific time intervals, etc.

If the change in the registry is identified, various operations may be carried out. For example, similar to operations 703-706, a plurality of file names may be identified in a registry of a computer. See operation 708. Next, in operation 710, duplicate file names in the registry are removed. Thereafter, files associated with the file names are scanned for spyware and/or malware, etc. See operation 712.

In the present embodiment, however, various additional options/variations may be employed, in view of the detection of a specific change in decision 702. For example, the file names identified in operation 708 may either include all of the file names in the registry, only the file name(s) that was the subject of the change identified in decision 702, and/or a combination thereof.

Further, as either a supplement or substitute for operations 708-712, the registry itself may be scanned in operation 714, in reaction to the detection of a change therein. Such scanning of the registry may further include scanning the registry for at least one predetermined key. Such predetermined key may thus be deleted upon the detection thereof. More information relating to such predetermined key will be set forth hereinafter in the context of an illustrative example of operation. It should thus be noted that any desired scanning (even that set forth during the description of FIGS. 3-6B) may be used after decision 702.

In one particular example involving a Microsoft® Windows® operating system, spyware can write the name thereof to HKEY_CLASSES_ROOT\CLSID\{a random number}. Because there are numerous random numbers the spyware can choose and this key is heavily used, it is sometimes inefficient to monitor such area directly. Moreover, just writing the file name in this area is not sufficient in terms of getting the operating system to run the spyware. However, one other requirement for the spyware may involve writing the same random number to a specific key such as HKEY_LOCAL_MACHINE\software\microsoft\windows\currentversion\explorer\browser helper objects. It may thus be very efficient to monitor such single key for changes in the aforementioned manner.

Because the spyware (and much malware, for that matter) needs to run all the time and not just when the user chooses the spyware to run, the spyware may need to find a way to coerce the operating system into running the same, for example, when the computer is actuated. On the Microsoft® Windows® operating systems, this procedure involves setting a value at some place in the registry which points to one of the spyware application files. For example, there is a key called HKLM\Software\Microsoft\Windows\CurrentVersion\Run. If a value is created in association with such key which contains the name of an executable file (e.g. the spyware executable, etc.), the operating system automatically runs such executable file when a user logs on to the computer. Thus, by monitoring such area for changes in the aforementioned manner, a procedure may be provided for exploiting the foregoing technique for the purpose of improved scanning.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing the infection thereof with malware, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for scanning files, comprising:
   determining whether a scan is scheduled;
   if it is determined that the scan is scheduled:
      identifying a plurality of file names in a registry of a computer, utilizing a processor; and
      scanning files associated with the file names, where the files with associated file names in the registry are scanned; and
   identifying a change in the registry of the computer;
   wherein duplicate file names are removed;
   wherein the determining whether the scan is scheduled is performed in parallel with the identifying the change in the registry of the computer.

2. A method for scanning files, comprising:
   determining whether a scan is scheduled;
   if it is determined that the scan is scheduled:
      identifying a plurality of file names in a registry of a computer, utilizing a processor; and scanning files associated with the file names, where the files with associated file names in the registry are scanned; and identifying a change in the registry of the computer;

wherein the files are scanned for spyware;

wherein the determining whether the scan is scheduled is performed in parallel with the identifying the change in the registry of the computer.

3. The method as recited in claim 2, wherein the spyware includes adware.

4. The method as recited in claim 2, wherein the spyware includes dialer software.

5. The method as recited in claim 2, wherein a first time required for the scanning is less than a second time required for scanning files stored on harddisks of the computer.

6. The method as recited in claim 2, wherein the registry includes a location on the computer for storing information including at least one of hardware that is attached to the computer, system options that have been selected, a configuration of memory of the computer, and application programs to be present when an operating system of the computer is started.

7. The method as recited in claim 2, wherein the method is utilized to counter terrorism by preventing infection of cyber-frameworks with malware initiated by terrorists.

8. The method as recited in claim 2, wherein the file names are identified utilizing a predetermined format associated therewith.

9. The method as recited in claim 8, wherein the format includes a path.

10. The method as recited in claim 9, wherein the path includes a drive letter.

11. The method as recited in claim 8, wherein the predetermined format includes the form: <drive letter><colon><backslash><path><name>.

12. The method as recited in claim 8, wherein the predetermined format distinguishes the names from other alphanumeric data in the registry of the computer.

13. The method as recited in claim 2, wherein the files are scanned for malware.

14. A method, comprising:
identifying a change in a registry of a computer, utilizing a processor;
conditionally performing a scan based on whether the change in the registry is identified, where the conditional scan is performed in order to identify malware or spyware that caused the change; and
determining whether a scan is scheduled;
wherein the conditional scan includes scanning at least one file and scanning each of a plurality of files identified in the registry;
wherein the identifying the change in the registry of the computer is performed in parallel with the determining whether the scan is scheduled.

15. The method as recited in claim 14, wherein the conditional scan includes scanning for malware.

16. The method as recited in claim 14, wherein the conditional scan includes scanning for spyware.

17. The method as recited in claim 16, wherein the spyware includes adware.

18. The method as recited in claim 16, wherein the spyware includes dialer software.

19. The method as recited in claim 14, wherein a first time required for the conditional scan is less than a second time required for scanning files stored on harddisks of the computer.

20. The method as recited in claim 14, wherein the registry includes a location on the computer for storing information including at least one of hardware that is attached to the computer, system options that have been selected, a configuration of memory of the computer, and application programs to be present when an operating system of the computer is started.

21. The method as recited in claim 14, wherein the method is utilized to counter terrorism by preventing infection of cyber-frameworks with malware initiated by terrorists.

22. The method as recited in claim 14, wherein the change includes a change to any file name in the registry.

23. The method as recited in claim 14, wherein the registry is continuously monitored for identifying the change.

24. The method as recited in claim 14, wherein a scheduled scan is performed on a periodic basis.

25. The method as recited in claim 24, wherein the conditional scan is performed prior to the scheduled scan.

26. The method as recited in claim 24, wherein the conditional scan is performed in parallel with the scheduled scan.

27. The method as recited in claim 14, wherein the conditional scan includes scanning the registry.

28. The method as recited in claim 27, wherein the scanning of the registry includes scanning the registry for at least one predetermined key.

29. The method as recited in claim 28, wherein the at least one predetermined key is deleted upon detection thereof.

30. A method, comprising:
identifying a change in a registry of a computer, the change including a change to any file in the registry, utilizing a processor;
conditionally performing a scan based on whether the change in the registry is identified, where the conditional scan is performed in order to identify malware or spyware that caused the change; and
determining whether a scan is scheduled;
wherein the conditional scan includes scanning at least one file;
wherein the at least one file includes only files associated with a changed file name;
wherein the identifying the change in the registry of the computer is performed in parallel with the determining whether the scan is scheduled.

31. A method, comprising:
determining whether a scan is scheduled, utilizing a processor;
if it is determined that the scan is scheduled:
identifying a plurality of file names in a registry of a computer,
removing duplicate file names in the registry of the computer, and
scanning files associated with the file names for spyware and malware;
identifying a change in the registry of the computer; and
if the change in the registry is identified:
identifying the file names in the registry of the computer,
removing the duplicate file names in the registry of the computer,
scanning the files associated with the file names for the spyware and the malware,
scanning the registry for predetermined keys, and
removing the predetermined keys;
wherein the determining whether the scan is scheduled and the identifying the change in the registry of the computer are performed in parallel.

* * * * *